US009486941B2

(12) United States Patent
Tapia et al.

(10) Patent No.: US 9,486,941 B2
(45) Date of Patent: Nov. 8, 2016

(54) PRODUCTION APPARATUS AND A METHOD FOR MANUFACTURING ELONGATED PRODUCTS SUCH AS WIND TURBINE BLADES

(71) Applicant: Vestas Wind Systems A/S, Aarhus N. (DK)

(72) Inventors: Raul Garcia Tapia, Portsmouth (GB); Chris Davey, Wiltshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 330 days.

(21) Appl. No.: 14/354,394

(22) PCT Filed: Oct. 26, 2012

(86) PCT No.: PCT/DK2012/050395
§ 371 (c)(1),
(2) Date: Apr. 25, 2014

(87) PCT Pub. No.: WO2013/060336
PCT Pub. Date: May 2, 2013

(65) Prior Publication Data
US 2014/0306376 A1    Oct. 16, 2014

Related U.S. Application Data

(60) Provisional application No. 61/552,004, filed on Oct. 27, 2011.

(30) Foreign Application Priority Data

Oct. 31, 2011    (DK) .................................. 2011 70587

(51) Int. Cl.
B29C 33/26    (2006.01)
B29L 31/08    (2006.01)
B29C 70/38    (2006.01)
(52) U.S. Cl.
CPC .............. *B29C 33/26* (2013.01); *B29C 70/38* (2013.01); *B29L 2031/085* (2013.01); *Y02P 70/523* (2015.11)

(58) Field of Classification Search
CPC . B29C 33/26; B29C 33/28; B29L 2031/085; Y02P 70/523
See application file for complete search history.

(56) References Cited

U.S. PATENT DOCUMENTS

2008/0277834 A1* 11/2008 Schibsbye ............... B29C 33/26
264/334
2012/0205048 A1* 8/2012 Mironov ............... B29C 31/044
156/365

(Continued)

FOREIGN PATENT DOCUMENTS

DK    200400032 U3    5/2005
WO    2007054088 A1    5/2007

(Continued)

OTHER PUBLICATIONS

International Bureau, Notification Concerning Transmittal of International Preliminary Report on Patentability, issued in corresponding International Application No. PCT/DK2012/050395, dated Apr. 29, 2014, 5 pages.

(Continued)

*Primary Examiner* — William Bell
(74) *Attorney, Agent, or Firm* — Wood Herron & Evans LLP

(57) ABSTRACT

An apparatus comprising elongated first and second moulds (2,3) extending in parallel, a drive mechanism (4) to move said second mould in relation to said first mould, from a first position to a second position so as to form a mould assembly, and a transport system comprising a movable part (5) movable along the first mould and/or the second mould and supported by an elongated intermediate support member (7) located between the moulds, the intermediate support member moving from a support position in which it supports the movable part, to a non-interference position in which interference with the moulds and/or the mould drive mechanism is avoided when said second mould is moved from the first position to the second position, the transport system comprising a securing device (71, 84, 83, 83*a,* 83*b,* 831, 83*e*) for locking the intermediate support member in the support position.

14 Claims, 8 Drawing Sheets

(56) References Cited

U.S. PATENT DOCUMENTS

2013/0119582 A1* 5/2013 Schibsbye ............ B29C 31/006
264/310
2014/0215783 A1* 8/2014 Bech ..................... B29C 33/26
29/23.51

FOREIGN PATENT DOCUMENTS

| WO | 2010133729 A1 | 11/2010 |
| WO | 20100129492 A2 | 11/2010 |
| WO | 2011035539 A1 | 3/2011 |

OTHER PUBLICATIONS

International Searching Authority, International Search Report and Written Opinion issued in corresponding PCT Application No. PCT/DK2012/050395 dated Apr. 9, 2013, 8 pages.

Danish Patent Office, Combined search and examination report issued in corresponding DK application No. PA 2011 70587 dated Aug. 15, 2012, 4 pages.

* cited by examiner

PRODUCTION APPARATUS AND A METHOD FOR MANUFACTURING ELONGATED PRODUCTS SUCH AS WIND TURBINE BLADES

TECHNICAL FIELD

The present invention relates to a production apparatus comprising an elongated first mould, an elongated second mould extending in parallel to said first mould, a mould drive mechanism coupled at least to said second mould and configured to move said second mould relatively to said first mould, from a first mould position to a second mould position so as to form a mould assembly, and a transport system comprising a movable part configured to be movable along said first or second moulds.

BACKGROUND

Wind turbine blades are often made of fibre reinforced polymer materials. In the manufacturing of such blades often two elongated blade shell moulds placed side by side are used, whereby material is placed in them, the material is cured, and then one of the moulds is turned over the other one. The turning can be done with the cured blade shell material, and usually a connecting structure, such as a spar or a pair of webs, is placed so as to be bonded internally between the shells when the mould has been turned. The turning is usually effected by a turner mechanism connecting the mould halves and comprising drive units and turner arms which swing one of the mould over on top of the other one.

Due to the significant length of many modern wind turbine blades, the use of a gantry system for transporting material to the moulds and placing material in the moulds can be advantageous, and it has been suggested e.g. in DK200400032U3 and WO2007/054088A1. Such a system typically involves one or more movable parts in the form of gantry cranes, each extending transversaly over one of the moulds, which cranes can carry rolls of material, spray equipment, robots or human interface controlled devices. The gantries are supported by elongated support members in the form of rails extending parallel to the moulds and on either side of them. Further the gantries are arranged to move along the mould and to be positioned at any location along the moulds by being driven and guided along the rails.

A problem occurring in production apparatuses of the type described above is interference between the turner arms and a centre rail of the gantry system located between the moulds. In this respect WO2011/035539 describes an automated production system for wind turbine blades. To solve said problem, the centre rail comprises gaps that are positioned such that the turner arms can move through the corresponding gaps when closing the mould. In the open position of the mould assemblies the gaps may be "bridged" by a specific wheel system on the gantry that allows the crossing of the gaps without losing contact to the centre rail. As an alternative it is suggested to close the gaps for gantry use by bridge sections, which are removed for passing of the turner arms. Although the production system described in this document may provide for certain advantages with respect to allowing access of the moulds, there is still room for improvement so as to solve said interference problem in a manner that retains a high degree of structural integrity of the apparatus.

SUMMARY

It is an object of the present invention to provide a production apparatus that solves said interference problem while still providing an apparatus with a very high degree of support and structural integrity, in particular regarding stiffness.

Said object is reached with a production apparatus comprising:
- an elongated first mould,
- an elongated second mould extending in parallel to said first mould,
- a mould drive mechanism coupled at least to said second mould and configured to move said second mould in relation to said first mould, from a first mould position to a second mould position so as to form a mould assembly, and
- a transport system comprising
  - a movable part configured to be movable along the first mould and/or the second mould while being supported by an elongated intermediate support member located laterally between the moulds and extending along the moulds,
  - the intermediate support member being configured to move from a support position in which it can support the movable part, to a non-interference position in which interference with the moulds and/or the mould drive mechanism is avoided when said second mould is moved from the first mould position to the second mould position,
  - the transport system further comprising a securing device for locking the intermediate support member in the support position.

In the first mould position, the moulds are in an open position, and the mould surfaces are facing at least partially upwards for material to be deposited onto them, which can be done with the transport system. By being configured to be movable along said first or second moulds, the movable part of the transport system can be positioned at a plurality of locations along said moulds while being supported and possibly also guided by the intermediate support member. The transport system can comprise a support structure which is fixed in relation to a foundation for the production apparatus, and which supports the intermediate support member in the support position.

The invention is suited for production apparatuses where, in the support position of the intermediate support member, there would be interference between the intermediate support member and the moulds and/or the mould drive mechanism if an attempt would be made to move the second mould from the first mould position to the second mould position. This interference problem is solved by moving the intermediate support member from the support position to the non-interference position in which said interference is avoided.

The intermediate support member can be configured to move from the support position to the non-interference position by means of a support drive mechanism, examples of which are given below, and preferably the securing device is separate from the support drive mechanism. The securing device minimises or eliminates any movement of the intermediate support member in the support position, which could otherwise have been allowed by an inactive support drive mechanism for the intermediate support member. This allows the moving part of the transport system to be heavy and to move quickly without the risk of deformation or movement of the intermediate support member causing is to lose its supporting and guiding function for the moving part. Thus, the invention provides for designing an intermediate support member which in its entirety can be moved to a non-interference position, and can thus be uninterrupted, i.e.

without gaps for the mould drive mechanism, but which can also be locked to the support position by the securing device and thus provide a very stable support for the moving part.

The invention is particularly suitable for apparatuses where the moulds are configured to enable formation of a wind turbine blade. Of course said transport system can comprise elongated outer support members extending along said first and second moulds. Thereby the movable part can be a gantry extending laterally over one of the moulds and being supported on the intermediate support member and one of the outer support members.

Preferably, the movement of the intermediate support member from the support position to the non-interference position comprises a translational movement directed away from the support position, and preferably at least partly upwards, to an intermediate position, and a rotational movement, along an axis of rotation, from the intermediate position to the non-interference position. Thus, the translational movement and the rotational movement are two independent, separate movements. Preferably, the axis of rotation of the rotational movement of said intermediate support member is oriented along a length direction of said first and second moulds. Preferably, the intermediate position exposes an articulated joint for the rotational movement, which joint, in the support position, is retracted into a support structure, which is fixed to a foundation of the production apparatus.

For the translational movement, which preferably is at least partly vertical, of the intermediate support member, the support drive mechanism can comprise a simple and robust construction, since a linear movement can be realised by a plurality of well-established actuators, such as hydraulic cylinders, pneumatic cylinders, motors and gearbox combinations, and the like. For the rotational movement the support drive mechanism can comprise other well-established actuators, such as hydraulic or pneumatic actuators, electric motors, and the like.

Preferably, where the transport system comprises a support structure, which is fixed to a foundation of the production apparatus, the securing device comprises at least one male part presented by the intermediate support member and at least one female part presented by the support structure, or vice versa, which male and female parts are complementary and are adapted to be in engagement with each other in the support position preferably at least partly by means of gravity acting on the intermediate support member. Thereby the securing device can comprise a seat presented by the support structure, and the intermediate support member can be adapted to rest by gravity against the seat in the support position. For clarification: the male part can be presented by the intermediate support member and the female part can be presented by the support structure, or the male part can be presented by the support structure and the female part can be presented by the intermediate support member.

In some embodiments, where the transport system comprises a support structure, which is fixed to a foundation of the production apparatus, the securing device comprises a seat presented by the support structure, the seat presenting at least two surfaces inclined towards each other, and said seat surfaces being adapted to receive the intermediate support member, e.g. between them. The surfaces of the seat can be both non-horizontal, and at least one of them facing partially upwards. In such an embodiment, the intermediate support member can present surfaces that are complementary to said seat surfaces. This provides for a very stable gravity support for the intermediate support member, and will effectively lock the intermediate support member in its support position.

In alternative embodiments, examples of which are given below, the securing device is provided as a lock brace assembly adapted to bias the intermediate support member to the support position, or the securing device comprises a locking pin. Any of these embodiments are especially useful where the movement of the intermediate support member from the support position to the non-interference position comprises, or is constituted by, a rotational movement.

The object is also reached with a method for forming a wind turbine blade, the method comprising:
placing an elongated second mould in relation to an elongated first mould, extending in parallel to said second mould, in a first mould position, preferably in which the moulds are in an open position and the mould surfaces are facing at least partially upwards for material to be deposited onto them,
placing an elongated intermediate support member, extending along the moulds, in a support position, in which it is located laterally between the moulds, in which it can support a movable part of a transportation system, and preferably in which it is supported by a support structure being fixed in relation to a foundation in a facility in which the method is carried out,
locking the intermediate support member in the support position by means of a securing device,
placing material onto the moulds, by moving a movable part along said first or second moulds and while supporting, and preferably guiding, the movable part by the elongated intermediate support member, so as to form respective wind turbine blade parts in the moulds,
un-locking the intermediate support member from the support position,
moving the intermediate support member from the support position to a non-interference position in which interference with the moulds and/or a mould drive mechanism, coupled at least to said second mould, is avoided when said second mould is moved from the first mould position to a second mould position so as to form a mould assembly for joining the wind turbine blade parts, and
moving by means of the mould drive mechanism said second mould in relation to said first mould from the first mould position to the second mould position.

As can be understood in production the method is repeated, and the steps mentioned above can be followed by
moving by means of the mould drive mechanism said second mould in relation to said first mould from the mould second position to the first mould position,
moving the intermediate support member from the non-interference position to the support position, and
locking by means of the securing device the intermediate support member in the support position.

Advantageous embodiments of the method are defined in claims 9-14. It should be mentioned that in some embodiments, moving the intermediate support member to the support position and locking the intermediate support member in the support position, as well as un-locking the intermediate support member from the support position and moving the intermediate support member from the support position can be overlapping in time and can even be at least partly identical steps. For example, where the securing device comprises at least one male part presented by the intermediate support member and at least one female part presented by a support structure, or vice versa, which male and female parts are complementary and are adapted to be in engagement with each other in the support position, movements towards and away from the support position will include bringing the male and female parts into and out of engagement with each other and thereby also locking and unlocking the intermediate support member.

DESCRIPTION OF THE FIGURES

Below embodiments of the invention will be described in detail with reference to the drawings in which.

DETAILED DESCRIPTION

Figure 1:
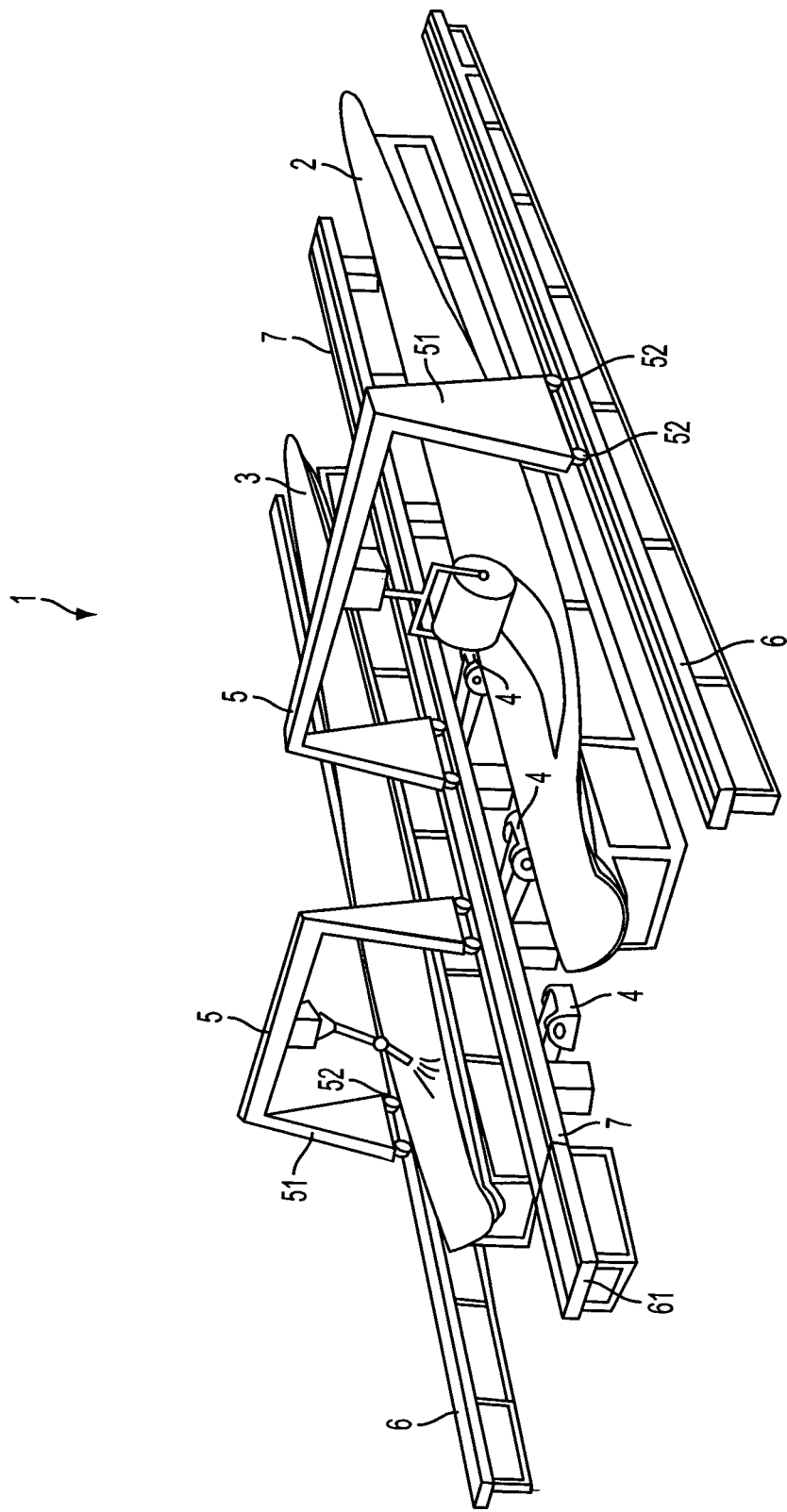
FIG. 1 shows a perspective view of a production apparatus according to an embodiment of the invention, FIG. 2 show a side view of parts of the production apparatus in FIG. 1 as seen in the direction of an axis of rotation of a mould.

FIG. 1 shows a production apparatus, according to an embodiment of the invention, for manufacturing wind turbine blades. The apparatus 1 comprises an elongated first mould 2 and an elongated second mould 3 extending in parallel to said first mould 2. The mould 2, 3 are provided for laying up and curing fibre reinforced plastics (e.g. glass or carbon reinforced epoxy or polyester) to form pressure and suction side shells of a wind turbine blade.

Figure 2:
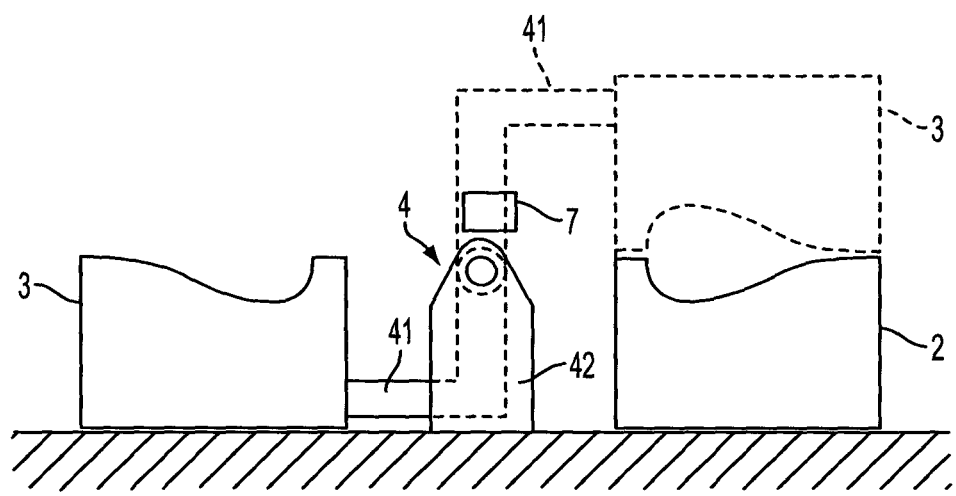

Reference is made also to FIG. 2. After the curing of the shells, a blade spar (not shown) is placed in the first mould 2 so as to be bonded internally between the shells, and the second mould 3 is turned to a position over the first mould 2 so as to close the blade structure. For this turning, the apparatus comprises a mould drive mechanism 4 which is coupled to the second mould 3 and configured to move the second mould relatively to said first mould 2, from a first mould position to a second mould position, shown in FIG. 2 with broken lines, so as to form a mould assembly. The mould drive mechanism 4 comprises plurality of turner arms 41, which are located between the moulds 2, 3, distributed along the moulds 2, 3, in one end fixedly connected to the second mould 3 and in the other end connected via an articulated joint to a respective turner arm support 42. Drive units, e.g. hydraulic cylinders, are provided for effecting the turning of the turner arms 41 with the second mould 3.

As can be seen in FIG. 1, the apparatus also comprises a transport system comprising movable parts in the form of gantries 5, each configured to be movable along a respective of the moulds 2, 3. The gantries extent laterally over the respective moulds and have legs 51 at each end. Each gantry 5 is supported with one of the legs 51 on an elongated outer support member 6 and with the other leg on an elongated intermediate support member 7. The intermediate support member 7, herein also referred to as the centre beam 7, is located laterally between the moulds 2, 3, and the outer support members 6 are located outside a respective of the moulds 2, 3. The support members 6, 7 extend along the moulds, and are here embodied as beams with rails, and the gantries 5 have wheels 52 on the bottom of the legs 51 so that they can be driven, e.g. with suitable electric motors (not shown), and guided along the rails of the beams 6, 7, and be positioned at a plurality of locations along said moulds. The gantries 5 can hold material and can be adapted to deposit the material in the moulds, e.g. by unrolling fiber rolls or spraying gel coat. In this embodiment the centre beam 7 supports gantries for both moulds 2, 3, and is thus provided with two rails. As an alternative, two centre beams 7 can be provided, each supporting one or more gantries 5 for a respective mould 2, 3.

At one end of the centre beam 7, a parking beam 61 is provided. The parking beam 61 is fixed to a foundation for the production apparatus, e.g. a factory floor. As described below the centre beam 7 is movable. The parking beam 61 is adjacent and aligned with the centre beam 7, so that when the gantries are not in use, they can be parked on the parking beam 61 (and the ends of the outer support members 6), so as to allow the movement of the centre beam 7.

FIG. 2 shows the centre beam 7 in a position, herein referred to as a support position, in which it can support the gantries 5. To avoid interference with the turner arms 41 in the second mould position, shown with broken lines, the centre beam 7 is arranged as described below.

Figure 3:
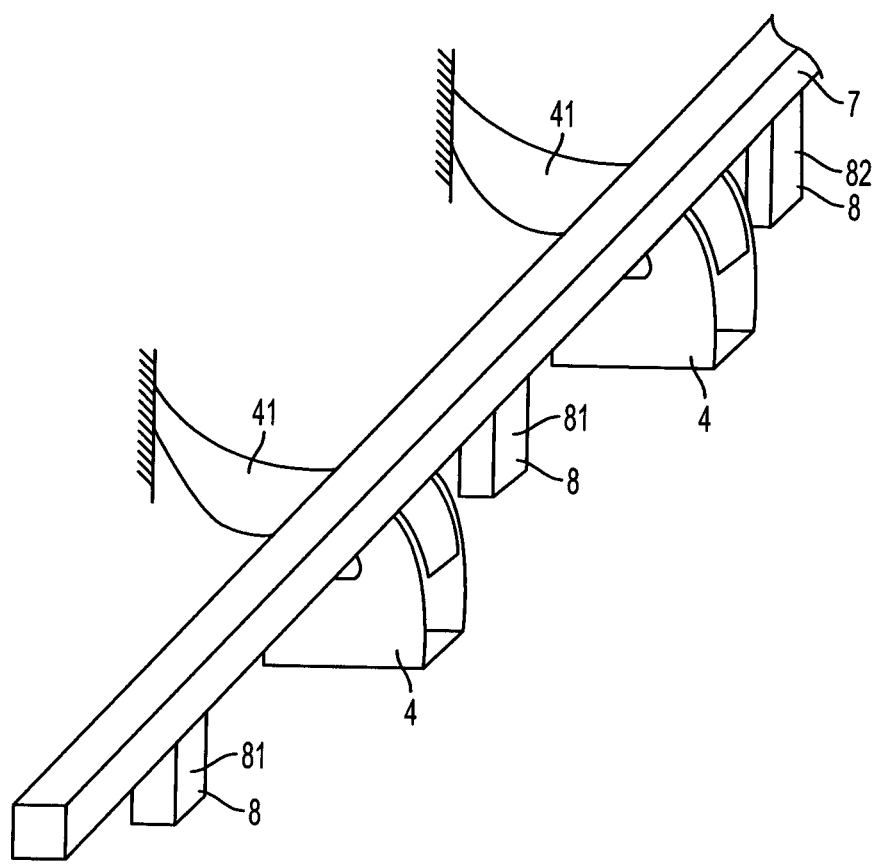
FIG. 3 shows a perspective view of parts of the production apparatus in FIG. 1, FIG. 4-FIG. 11 show cross-sectional views of some of the parts in FIG. 3 with the cross-sections oriented perpendicularly to an axis of rotation of a centre beam.

Reference is made to FIG. 3 showing a perspective view of a part of the centre beam 7 with a support structure 8 therefore, and also the mould drive mechanism 4; two turner arms 41 are shown in FIG. 3. The support structure 8 comprises active and passive posts 81, 82, (described further below), that are fixed in relation to the factory floor. The centre beam 7 is configured to move by means of a support drive mechanism, (not shown in FIG. 3), from a support position in which it is supported by the support structure 8, to a non-interference position in which interference with the turner arms 41 is avoided.

Figure 4:
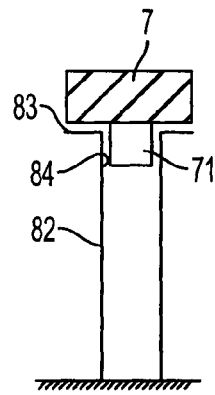
Figure 5:
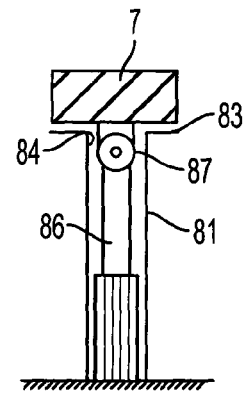

As can be seen in FIG. 4 and FIG. 5, the posts 81, 82 of the support structure 8 each comprise a seat 83 at an opening 84 facing upwards. The centre beam 7 has complementary male parts in the form of studs 71 adapted to fit into the openings 84. Thus the studs 71 and the openings 84 for male and female parts that are adapted to engage each other in the support position. The centre beam 7 is adapted to rest by gravity against the seats 83 in the support position, and the fit of the studs 71 into the openings 84 is tight enough to prevent any sideways movement.

Figure 6:
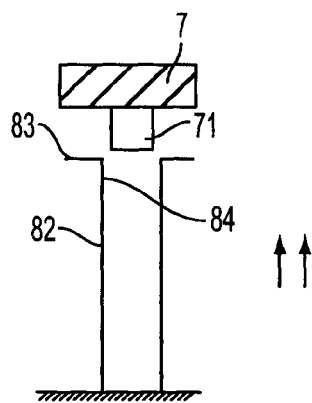
Figure 7:
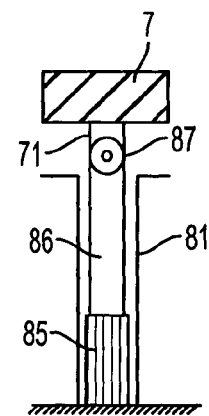
Figure 9:
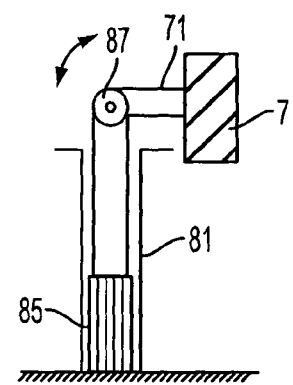

As can be seen in FIG. 6 and FIG. 7, the movement of the centre beam 7 from the support position to the non-interference position comprises a vertical translational movement. A support drive mechanism comprises hydraulic or pneumatic cylinders 85 and arms 86 in the active posts 81 (FIG. 7) for effecting the vertical translational movement to an intermediate position of the centre beam 7 exposing articulated joints 87 for a subsequent rotational movement (FIG. 9). As can be seen in FIG. 5, in the support position, the joints 87 are retracted into the respective openings 84, thereby preventing rotational movement of the centre beam 7. Thus, the seats 83, the studs 71 and the openings 84 serve to keep the joints 87 retracted and non-rotating, so as to lock the centre beam 7 in the support position. This minimises or eliminates any movement of the centre beam 7 in the support position, which could otherwise have been allowed by an inactive support drive mechanism for the centre beam 7.

For the rotational movement of the centre beam 7 the support drive mechanism can comprise well-established actuators (not shown), such as hydraulic cylinders, electric motors, and the like. The articulated joints 87 are aligned to form an axis of rotation of the centre beam 7 oriented along a length direction of the moulds 2, 3.

Figure 8:
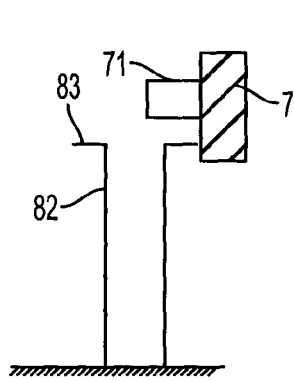
Figure 10:
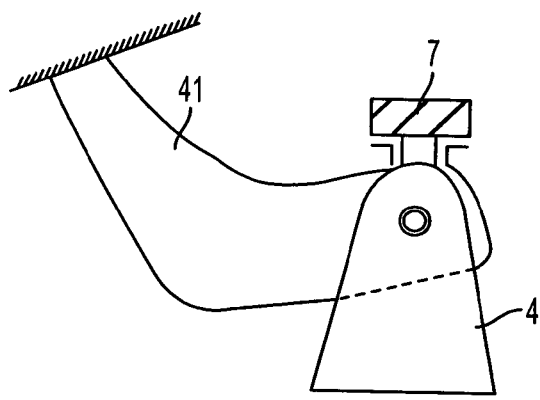
Figure 11:
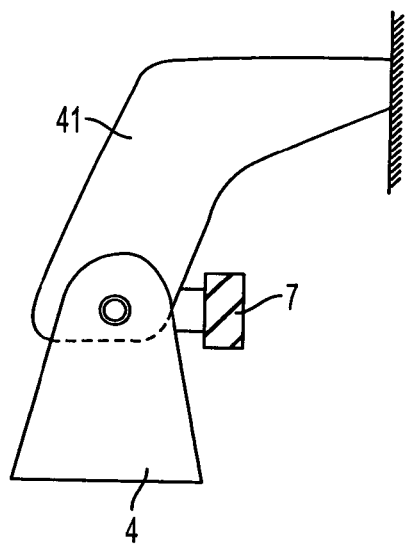
Figure 12:
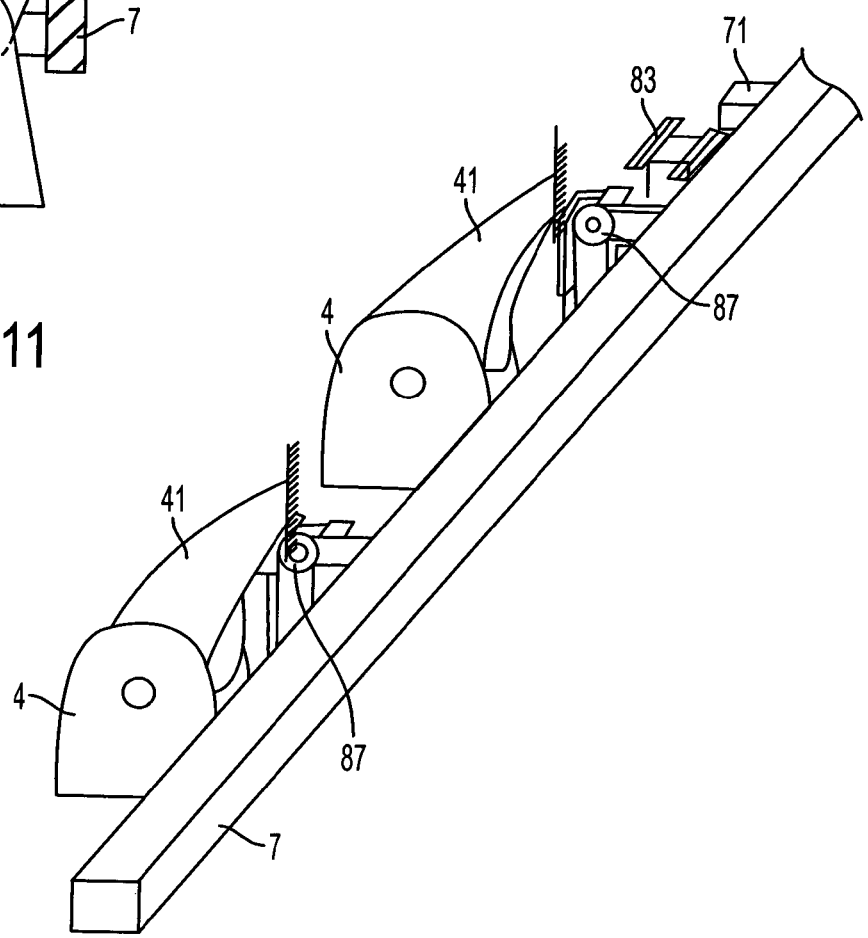
FIG. 12 shows the same perspective view as the one shown in FIG. 3, but with some of the parts moved.

As can be seen in FIG. 4, FIG. 6 and FIG. 8, the passive posts 82 of the support structure 8 serve to contribute to the locking and supporting of the centre beam 7 in the support position thereof, but they do not contribute to effecting the movement to the non-interference position. FIG. 10 shows one of the turner arms 10 in the first position of the second mould, and as can be seen in FIG. 11, and FIG. 12, the above described solution provides for moving the centre beam 7 to the non-interference position, out of the way for the turner arms 41.

Figure 12A:
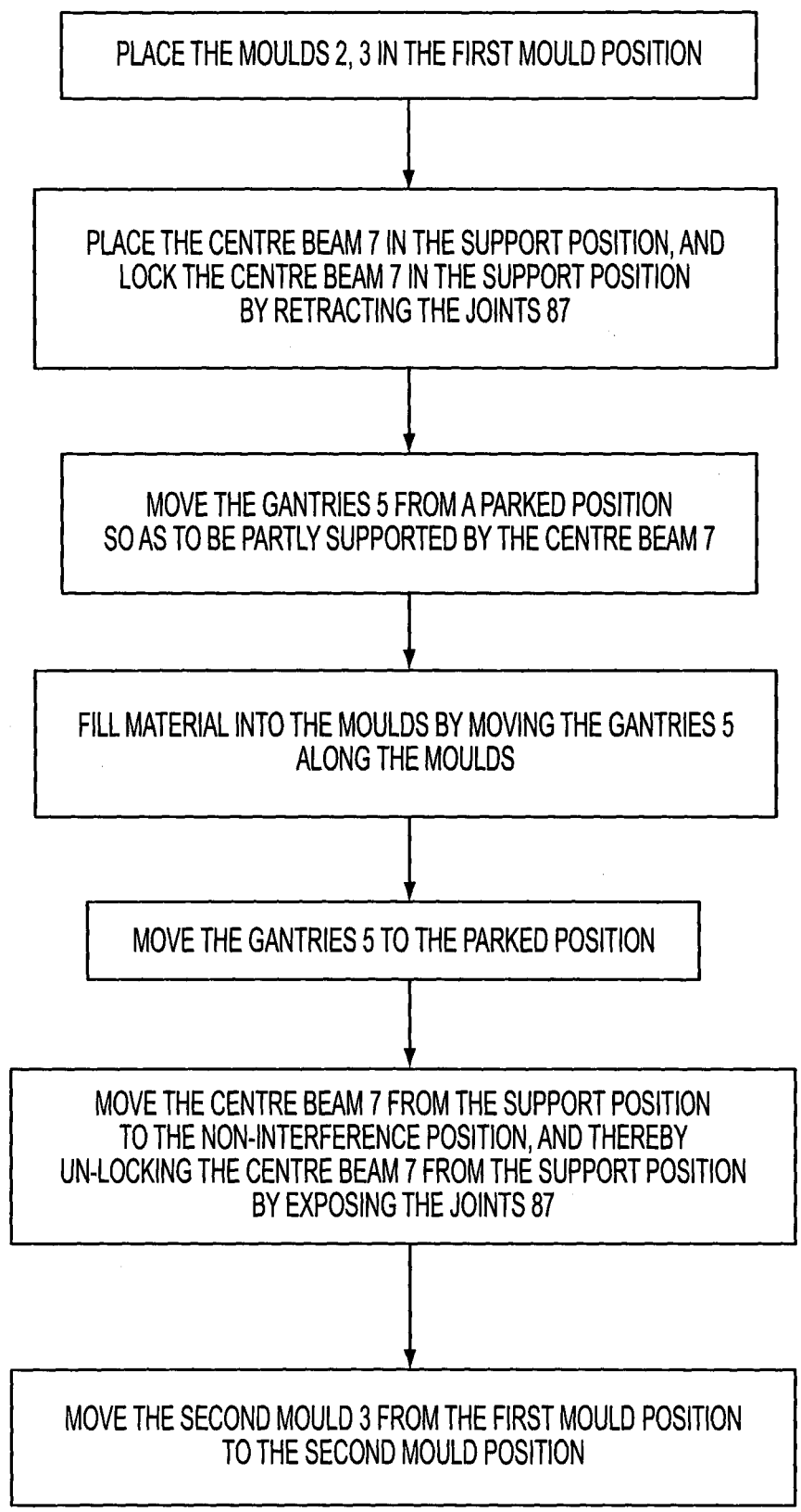
FIG. 12A shows a block diagram depicting a method for using the production apparatus in FIG. 1.

FIG. 12A shows a block diagram depicting a method for using the production apparatus described above. The method comprises:
  placing the moulds 2, 3 in the first mould position,
  placing the centre beam 7 in the support position, and thereby locking the centre beam 7 in the support position by retracting the joints 87,
  moving the gantries 5 from a parked position on the parking beam 61 and the ends of the outer support members 6, so as to be partly supported by the centre beam 7,
  filling material into the moulds by moving the gantries 5 along the moulds,
  moving the gantries 5 to the parked position on the parking beam 61 and the ends of the outer support members 6,
  moving the centre beam 7 from the support position to the non-interference position, and thereby un-locking the centre beam 7 from the support position by exposing the joints 87, and
  moving by means of the mould drive mechanism the second mould 3 in relation to the first mould 2 from the first mould position to the second mould position.

Figure 13:
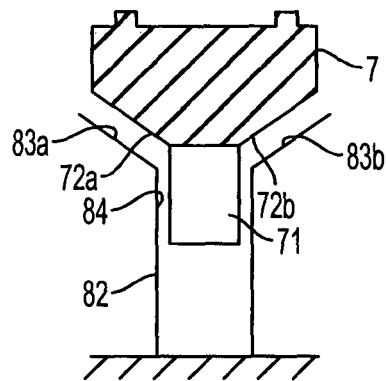
FIG. 13 shows a cross-sectional view, corresponding to the one shown in FIG. 4, of parts in an alternative embodiment of the invention.

Reference is made to FIG. 13 for presentation of an alternative embodiment, in other respects similar to the one described above, but differing as follows: The posts 81, 82 of the support structure 8, (FIG. 13 showing a passive post 82), present a seat which is provided by two surfaces 83*a*, 83*b* inclined towards each other. Both surfaces 83*a*, 83*b* are parallel to the longitudinal direction of the centre beam 7, and both are non-horizontal. More specifically, the surfaces 83*a*, 83*b* are tilted towards each other by the same angle to the horizontal plane, and they are located on opposite sides of the opening 84. Although one of the surfaces 83*a*, 83*b* could be vertical, in this embodiment none of them are vertical. Thus, they face partially upwards, so that they can receive the centre beam 7, which presents surfaces 72*a*, 72*b* that are complementary to said seat surfaces 83*a*, 83*b*, with the stud 71 into the opening 84. This provides for a very stable gravity support for the centre beam 7, and will effectively lock the beam 7 in its support position.

Figure 14:
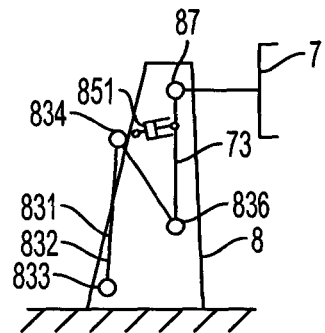
FIG. 14 and FIG. 15 show a cross-sectional views, corresponding to the ones shown in FIG. 9 and FIG. 5 respectively, of parts in a further alternative of the invention.
Figure 15:
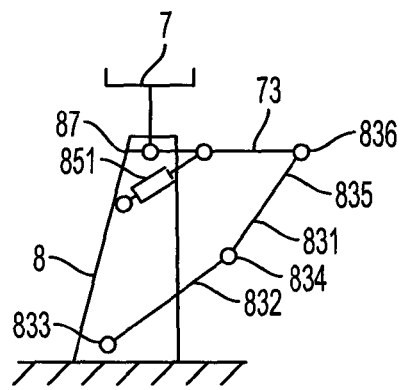

FIG. 14 and FIG. 15 shows a securing device for locking the centre beam 7 in the support position in a further alternative of the invention. Here the movement of the centre beam 7 from the support position to the non-interference position is constituted by a rotational movement of the centre beam 7 around articulated joints 87. The securing device is provided as a lock brace assembly 831 adapted to bias the centre beam 7 to the support position. The lock brace assembly comprises an arm 832 which at one end is connected, at a fixed articulated joint 833, to the support structure 8, and at the other end, at an articulated joint 834, to an end of another arm 835. The other arm 835 is, at an articulated joint 836 at its other end, connected to a free end of a local extension 73 of the centre beam 7. For moving the centre beam 7 from the non-interference position shown in FIG. 14 to the support position shown in FIG. 15, a support drive mechanism comprising hydraulic cylinders 851, acting between the support structure 8 and a respective of the local extensions 73 of the centre beam 7, effects the rotation of the centre beam 7. When the support position is reached, the lock brace assembly 831 will bias the centre beam 7 to the support position. A separate drive unit (not shown) can be provided to retract the lock brace assembly 831 when the centre beam 7 is to be moved back to the non-interference position.

Figure 16:
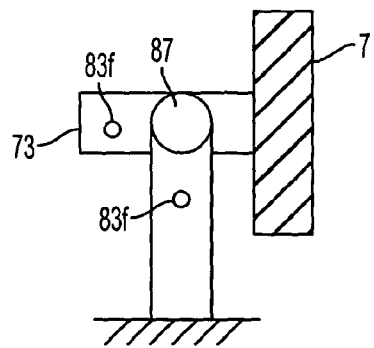
FIG. 16 and FIG. 17 show a cross-sectional views, corresponding to the ones shown in FIG. 9 and FIG. 5 respectively, of parts in yet another alternative of the invention.
Figure 17:
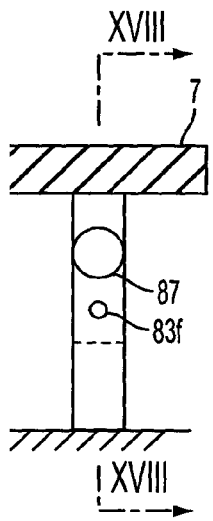
Figure 18:
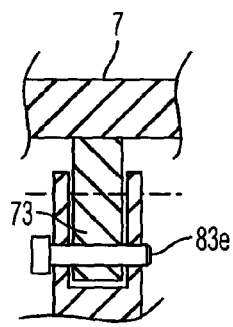
FIG. 18 shows a cross-section of the parts in FIG. 17 with the cross-section oriented as indicated by the arrows XVIII-XVIII in FIG. 17.

FIG. 16, FIG. 17 and FIG. 18 show a securing device for locking the centre beam 7 in the support position in a yet another alternative of the invention. Here the movement of the centre beam 7 from the support position to the non-interference position is constituted by a rotational movement of the centre beam 7 around articulated joints 87. The securing device comprises locking pins 83*e* adapted to extend through holes 83*f* in the support structure 8 and in local extensions 73 of the centre beam 7. For moving the centre beam 7 from the non-interference position shown in FIG. 16 to the support position shown in FIG. 17 and FIG. 16, a support drive mechanism (not shown) effects the rotation of the centre beam 7. When the support position is reached, the holes 83*f* in the support structure 8 and in local extensions 73 are aligned and the locking pins 83*e* are inserted through the holes 83*f*, thereby locking the centre beam 7 to the support position.

The invention claimed is:
1. A production apparatus comprising:
  an elongated first mould,
  an elongated second mould extending in parallel to said first mould,
  a mould drive mechanism coupled at least to said second mould and configured to move said second mould in relation to said first mould, from a first mould position to a second mould position so as to form a mould assembly, and
  a transport system comprising
    a movable part configured to be movable along the first mould and/or the second mould while being supported by an elongated intermediate support member located laterally between the moulds and extending along the moulds,
    the intermediate support member being configured to move from a support position in which it can support the movable part, to a non-interference position in which interference with the moulds and/or the mould drive mechanism is avoided when said second mould is moved from the first mould position to the second mould position,
    the transport system further comprising a securing device for locking the intermediate support member in the support position.

2. The production apparatus according to claim 1, wherein the movement of the intermediate support member from the support position to the non-interference position comprises a translational movement directed away from the support position to an intermediate position, and a rotational movement, along an axis of rotation, from the intermediate position to the non-interference position.

3. The production apparatus according to claim 2, wherein the intermediate position exposes at least one articulated joint for the rotational movement, which joint, in the support position, is retracted into a support structure, which is fixed to a foundation of the production apparatus.

4. The production apparatus according to claim 1, wherein the transport system comprises a support structure, which is fixed to a foundation of the production apparatus, and the securing device comprises at least one male part presented by the intermediate support member and at least one female part presented by the support structure, or vice versa, which male and female parts are complementary and are adapted to be in engagement with each other in the support position.

5. The production apparatus according to claim 1, wherein the transport system comprises a support structure, which is fixed to a foundation of the production apparatus, and the securing device comprises a seat presented by the support structure, the seat presenting at least two surfaces inclined towards each other, and said seat surfaces being adapted to receive the intermediate support member.

6. The production apparatus according to claim 1, wherein the securing device is provided as a lock brace assembly adapted to bias the intermediate support member to the support position.

7. The production apparatus according to claim 1, wherein the securing device comprises a locking pin.

8. A method for forming a wind turbine blade, the method comprising:
    placing an elongated second mould in relation to an elongated first mould, extending in parallel to said second mould, in a first mould position,
    placing an elongated intermediate support member, extending along the moulds, in a support position, in which it is located laterally between the moulds and in which it can support a movable part of a transportation system,
    locking the intermediate support member in the support position by means of a securing device,
    placing material onto the moulds, by moving a movable part along said first or second moulds and while supporting the movable part by the elongated intermediate support member, so as to form respective wind turbine blade parts in the moulds,
    un-locking the intermediate support member from the support position,
    moving the intermediate support member from the support position to a noninterference position in which interference with the moulds and/or a mould drive mechanism, coupled at least to said second mould, is avoided when said second mould is moved from the first mould position to a second mould position so as to form a mould assembly for joining the wind turbine blade parts, and
    moving by means of the mould drive mechanism said second mould relatively to said first mould from the first mould position to the second mould position.

9. The method according to claim 8, wherein moving the intermediate support member from the support position to the non-interference position, comprises translating the intermediate support member away from the support position, and at least partly upwards, to an intermediate position, and rotating the intermediate support member along an axis of rotation, from the intermediate position to the noninterference position.

10. The method according to claim 9, wherein the intermediate position exposes at least one articulated joint for the rotational movement, which joint, in the support position, is retracted into a support structure, which is fixed to a foundation of a facility in which the method is carried out.

11. The method according to claim 8, wherein the transport system comprises a support structure, which is fixed to a foundation of a facility in which the method is carried out, and locking the intermediate support member in the support position comprises bringing at least one male part presented by the intermediate support member and at least one female part presented by the support structure, or vice versa, into engagement with each other.

12. The method according to claim 8, wherein the transport system comprises a support structure, which is fixed to a foundation of a facility in which the method is carried out, and the securing device comprises a seat presented by the support structure, the seat presenting at least two surfaces inclined towards each other, and locking the intermediate support member in the support position comprises said seat surfaces receiving the intermediate support member.

13. The method according to claim 8, wherein the step of locking the intermediate support member in the support position comprises biasing the intermediate support member to the support position by a lock brace assembly.

14. The method according to claim 8, wherein the step of locking the intermediate support member in the support position comprises inserting a locking pin through holes in a support structure and in the intermediate support member.

* * * * *